July 19, 1932. B. NIELSEN 1,867,677
MILK AND CREAM CAN COVER
Filed Oct. 14, 1929
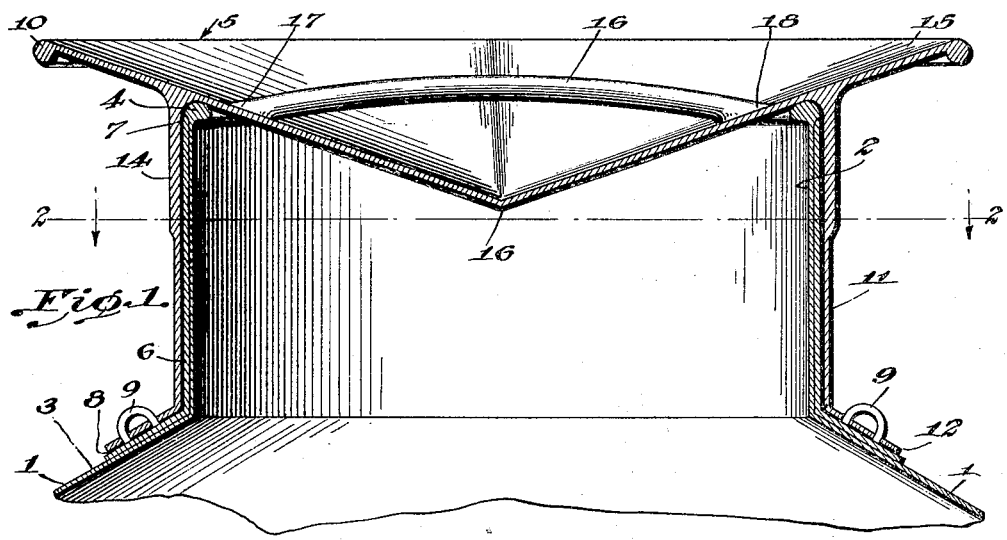
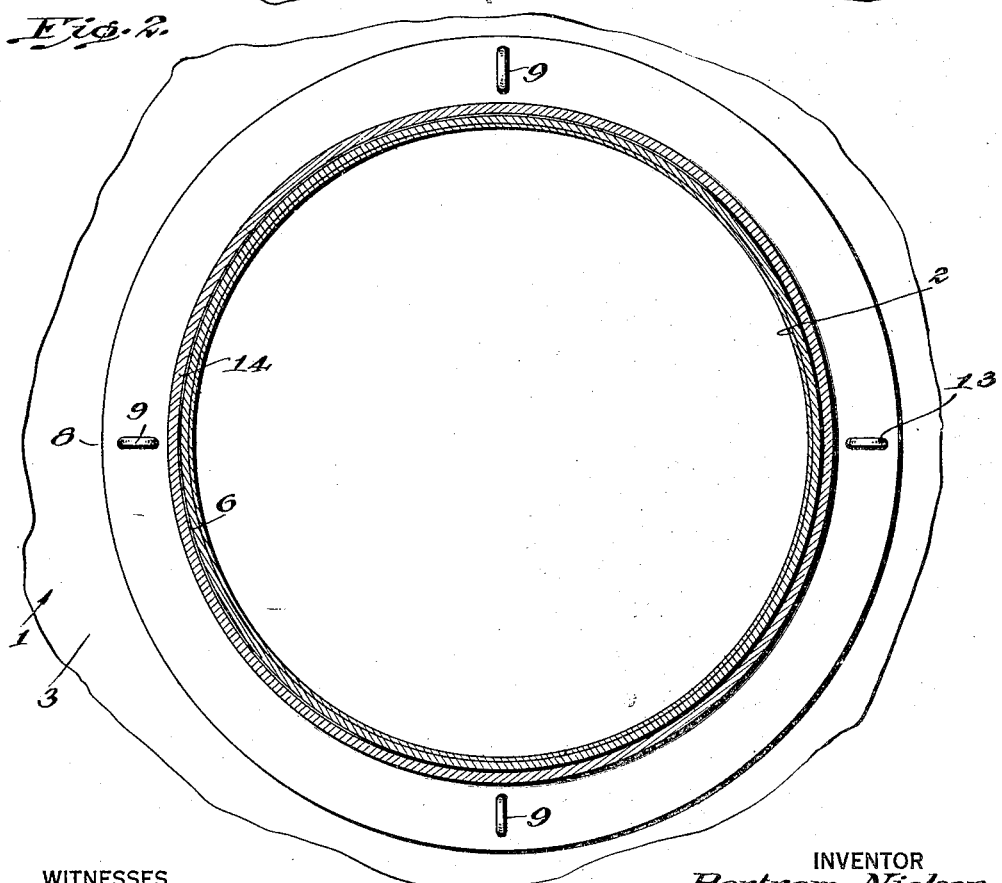
INVENTOR
Bertram Nielsen,
BY
ATTORNEY Patented July 19, 1932

1,867,677

UNITED STATES PATENT OFFICE

BERTRAM NIELSEN, OF SEATTLE, WASHINGTON

MILK AND CREAM CAN COVER

Application filed October 14, 1929. Serial No. 399,563.

My invention relates to improvements in can covers, and more particularly to can covers used on milk and cream cans and cans of similar nature, and consists in the combinations, constructions and arrangements herein described and claimed.

An object of my invention is to provide a can cover of the type described which is readily mountable and demountable on the milk and cream cans now in conventional use.

A further object of my invention is to provide a locking attachment for my cover which is adapted to be readily fitted to cans of this nature of conventional construction.

A further object of my invention is to provide a cover for a milk or cream can that will prevent contact between the milk and cream in said cans and the engaging surfaces of said can and said cover whereby the milk is kept from becoming what is known in the trade as "metallic", due to the presence of metal particles becoming suspended in said milk or cream due to the frictional sliding engagement of the surfaces of the neck of the can and its cover.

A further object of my invention is to provide a cover for milk and cream cans which will relieve the neck of said cans from strains and stresses encountered when the cans are stacked, thereby preventing the telescoping of the neck of said cans.

A further object of my invention is to provide a can cover that will prevent the contents of the can from splashing therefrom.

A further object of my invention is to provide a can cover that will prevent the entrance of foreign matter into the can when closed.

A further object of my invention is to provide a device of the type described which is simple in construction, has few parts and is not likely to get out of order easily.

Other objects and advantages will appear in the following specification and the novel features of the invention will be particularly pointed out in the appended claims.

My invention is illustrated in the accompanying drawing, forming part of this application, in which:

Figure 1 is a sectional elevational view of my invention, with parts thereof shown in elevation; and Figure 2 is a sectional view, on line 2—2 of Figure 1.

In carrying out my invention I make use of an ordinary milk can generally designated at 1 and having a neck of conventional form generally shown at 2. As is well known in the trade these milk cans are provided with the sloping shoulder portions 3 at the base of said neck, and beaded or flanged portions 4 adjacent the mouth thereof.

For mounting my cover 5 in locked position about said neck 2, I provide an annulus or locking collar member 6 adapted to be pressed over the neck of a milk or cream can of conventional form. As is seen from an examination of Figure 1 this locking collar is held in fixed relation to said neck 2 by means of bead 4 which may be spread into engagement with the end thereof as shown at 7. The lower portion of this collar is flared outwardly forming an annular flange 8 adapted to engage the shoulder portion 3 and provided with staple members 9 for a purpose soon to be described.

My cover 5 having the bead 10 comprises a cylindrical portion 11 adapted to engage the outside surface of locking collar 6 and provided with a flared portion or annular flanged portion 12 adjacent the base thereof for engagement with the flanged portion 8 of the locking collar 6, as shown in Figure 1. This annular flanged portion 12 is provided with suitably formed slots 13 properly positioned for engagement with the staple members 9. As shown in Figure 1 these staple members 9 project through the slots 13 and above the flanged portions 12 for a reason that will presently appear. This cylindrical portion 11 of my cover is enlarged adjacent the upper end thereon, as shown at 14, for the purpose of adding strength to my structure at this point. Integral with the cylindrical portion 11 is a cap member 15 connected with said cylindrical portion 11 at its enlarged end 14. This cap portion is of inverted conical shape having the apex of the cone projecting inwardly and positioned in the lateral center of the neck of the cone, as shown at 16, those portions of the elements of the conical surface composing this cap which would be adjacent the base of the cone projecting beyond the walls comprising the cylindrical portion 11 of the cover.

This cap portion 15 of the cover 5 is provided with a handle member 16 integrally connected to said cap member, as shown at 17 and 18.

From the foregoing description of the various parts of the device, the operation thereof may be readily understood. This cover as has been heretofore set forth is designed for use on milk cans of conventional design. When it is desired to adapt this cover to milk cans of the type described the locking collar 6 is pressed over the neck 2 of said can and the bead 4 spread over the end of said locking collar, as shown at 4. The cover is then placed over the locking collar with the slots 13 therein engaging the staples 9 of said locking collar in a manner easily understood. Suitable locking means of any nature, either conventional locks, wires, etc. may be then operatively engaged with said staple members 9 securing the cover in locked relation to the can. When it is desired to remove the cover it is merely necessary to remove said locking means and withdraw the cover from said neck. Due to the specially formed construction of the cap piece of my cover the downwardly projecting center thereof 16 will act as a baffle plate for the liquid contained in the can, preventing the same from splashing as in ordinary cans. In the event that some of the liquid seeps between the bead 4 at the mouth of the neck of the can and my cover it will not carry the metallic particles occasioned by the frictional engagement of my cover with the walls of the locking collar into solution with the liquid in the can.

It is further seen that when packed the forces exerted on the cover due thereto will be distributed along the shoulder 3 of the can and not be transmitted through the neck of the can to the joint of the neck with said can with consequent increased liability of breaking said connection and telescoping the neck within its can.

It is also seen that due to the angular relation of the plurality of frictional engaging surfaces between my cover and the can the liability of the entry of foreign matter from the outside into said can is greatly decreased.

I claim:

1. A milk can cover, comprising a cylindrical portion adapted to engage the outside wall or the neck of the can, an annular flanged portion adapted to engage the shoulder of the can adjacent the base of said neck, and locking means for said cover comprising a collar adapted to fit between said neck and said cover, and means integral with said collar for securing said cover in fixed position.

2. In a milk can, in combination, a collar having a cylindrical portion engaging the outside wall of the neck of a can, and a flanged portion engaging the shoulder of the can adjacent the base of said neck, a cover engaging about said collar, means for securing said collar to said can, and means for securing said cover to said collar.

3. In a milk can, in combination, a collar surrounding the neck of said can and a shoulder adjacent the base of said neck, and having upwardly projecting locking means thereon, a cover having a cylindrical portion and an annular flanged portion adapted to engage about said collar, a conically shaped cap portion, and means for engaging said upwardly projecting locking means, whereby said cover is sealably engaged with said can, and the splashing of the contained liquid is decreased.

4. In combination, a milk can having a cylindrical neck and sloping shoulders, a collar secured to said neck and having an annular flange complemental to said shoulders, means for securing said collar to said neck, said flange having a plurality of upwardly projecting fastening means, said cover having a cylindrical portion and annular flange for engagement around said collar and upon said first named flange, respectively, and said cover flange having a plurality of slots for reception of said fastening means.

5. In combination, a can having a cylindrical neck, a cover engageable thereover and having complemental abutting surfaces, and said cover having its top portion depressed to provide a centrally disposed inverted cone of a length to project downwardly into said neck beyond the upper abutting surfaces of said neck and cover.

BERTRAM NIELSEN.